United States Patent [19]

Gallagher

[11] 4,430,370
[45] Feb. 7, 1984

[54] THERMOPLASTIC MOLDED PART WITH STRESS REDUCING JUNCTURE

[75] Inventor: John E. Gallagher, Lenox, Mass.

[73] Assignee: General Electric Company, Pittsfield, Mass.

[21] Appl. No.: 260,819

[22] Filed: May 5, 1981

[51] Int. Cl.³ .............................................. B65D 1/22
[52] U.S. Cl. ................................... 428/35; 428/192; 428/542.8
[58] Field of Search ............... 206/234, 328, 332, 499; 264/138, 318; 150/0.5; 220/74, 83, 337, 339; 428/35, 130, 192, 542.8

[56] References Cited

U.S. PATENT DOCUMENTS

| | | | |
|---|---|---|---|
| 3,240,845 | 3/1966 | Voelker | 428/160 X |
| 3,551,940 | 1/1971 | Edison | 220/339 X |
| 3,816,181 | 6/1974 | Buckethal | 150/0.5 X |
| 3,907,193 | 9/1975 | Heller | 150/0.5 X |
| 4,249,357 | 2/1981 | Cornou | 428/67 X |
| 4,341,307 | 7/1982 | Shyers | 220/339 X |
| 4,359,157 | 11/1982 | Horstmann | 206/499 X |

FOREIGN PATENT DOCUMENTS 1146743  3/1969  United Kingdom ............... 428/167

Primary Examiner—Henry F. Epstein
Attorney, Agent, or Firm—Hedman, Gibson, Costigan & Hoare

[57] ABSTRACT

An improved thermoplastic molded part is disclosed including a stress reducing juncture which is operative to reduce the differential shrinkage of the molded plastic, which would otherwise develop due to the uneven cooling of the plastic to room temperature, thereby inhibiting the warping of the part. More specifically, an improved thermoplastic molded part is provided including at least one wall member formed unitary with another structural element such as another wall, flange or boss area. The thermoplastic part is further provided with a stress reducing juncture, defined by an elongated trough-like recess, located in the wall member adjacent the other structural element. Preferably, the recess has a width approximately equal to the width of the wall member and a depth equal to approximately one half that width. The recess functions to decrease internal stresses that normally develop due to differential shrinkage of the molded plastic during cooling to room temperature. By reducing internal stresses, the unwanted warping of the part is minimized.

10 Claims, 7 Drawing Figures

THERMOPLASTIC MOLDED PART WITH STRESS REDUCING JUNCTURE

BACKGROUND OF THE INVENTION

The subject invention relates to thermoplastic molded parts having a new and improved stress reducing juncture. More specifically, thermoplastic molded parts are disclosed including a stress reducing juncture, defined by an elongated trough-like recess, which is operative to reduce differential shrinkage of the molded plastic, which would otherwise develop due to the uneven cooling of the plastic to room temperature. By this arrangement internal stresses are decreased thereby inhibiting the warping of the part.

In the prior art, many plastic parts are produced by injection molding techniques. In injection molding a two-part die is manufactured consisting of a core and cavity, which when assembled, defines an internal recess corresponding to the dimensions of the plastic part to be produced. Molded plastic material, such as mineral or glass filled thermoplastic polyester, is injected under pressure into the internal recess of the mold through channels or gates provided in the mold. The molten thermoplastic material fills the recess in the mold thereby defining the shape of the part. After the injection step is completed, the core and cavity sections of the mold are separated such that the molded plastic part can be removed.

Once the part has been molded, the heated thermoplastic will cool to room temperature. The rate of cooling and corresponding shrinkage of any particular plastic is dependent, in part, upon its local thickness as defined by the dimensions of the part. As can be appreciated, most thermoplastic parts will not cool and shrink uniformly since the local thickness throughout the part is not constant. For example, wherever there is juncture between a wall and another structural element, such as a second wall, flange or boss area, the local thickness of the plastic is increased. Thus, as the plastic cools to room temperature, shrinkage rates vary throughout the part depending upon the local thickeness of the part. This differential shrinkage, which is particularly acute at the corners or junctures of the part, is responsible for the development of internal stresses within the part. Internal stresses frequently cause the molded part to warp, which is unacceptable in most applications.

Accordingly, in the prior art a variety of methods have been utilized in an attempt to inhibit the unwanted warping of molded thermoplastic parts. For example, attempts have been made to vary the particular plastic utilized in the molding operation in an effort to minimize uneven cooling and shrinkage thereby inhibiting the build-up of internal stresses. This method has not proved particularly effective and in addition, the substitution of different plastic material is frequently undesirable. Another method utilized to minimize the warpage of parts includes the redesigning of the part in order to adjust the local thickness of the various structural elements. More specifically, attempts have been made to vary the local thicknesses of the part to achieve a more uniform cooling gradient. As can be appreciated, the redesigning of a part requires considerable trial and error experimentation and in addition may result in a part having dimensions which fail to meet the desired specifications.

A third method used in the prior art consists of varying the gating which is incorporated into the dies. More particularly, the positioning and dimensions of the gates or channels, which direct the molten thermoplastic material, from an injection molding machine, to the interior of the mold, can be varied in order to reduce warpage. However, a change in the gating, similar to the above described method of changing the type of plastic material, is not particularly effective.

Accordingly, it is an object of the subject invention to provide a new and improved thermoplastic part having a stress reducing juncture which functions to inhibit the warping of the part during the cooling of the plastic to room temperature.

It is a further object of the subject invention to provide a new and improved thermoplastic molded part wherein a stress reducing juncture, defined by an elongated trough-like recess, is provided in a wall of the part and is operative to reduce the differential shrinkage of the molded plastic which would otherwise develop due to the uneven cooling of the plastic to room temperature.

It is another object of the subject invention to provide a new and improved thermoplastic molded part having a stress reducing juncture for inhibiting the warping of the part, which is located at the intersection between wall members or other structural elements such as a flange or boss area.

SUMMARY OF THE INVENTION

In accordance with these and many other objects, the subject invention provides for an improved thermoplastic molded part which includes at least one wall member formed unitary with at least one other structural element such as another wall, flange or boss area. The improvement consists of a stress reducing juncture which is defined by an elongated trough-like recess or restriction, located in the wall adjacent the other structural element. Preferably, the stress reducing juncture or recess has a width approximately equal to the width of the wall member. In addition, the depth of the recess is preferably equal to approximately one-half the width of the wall member. The stress reducing juncture functions to permit the plastic molded part to cool in a more uniform manner thereby minimizing internal stresses which might otherwise develop. By this arrangement, the warping of the part due to the internal stresses is inhibited.

These and many other objects and advantages of the subject invention will become apparent from the following detailed description taken in conjunction with the drawings in which:

DESCRIPTION OF THE PREFERRED EMBODIMENTS

Figure 1:
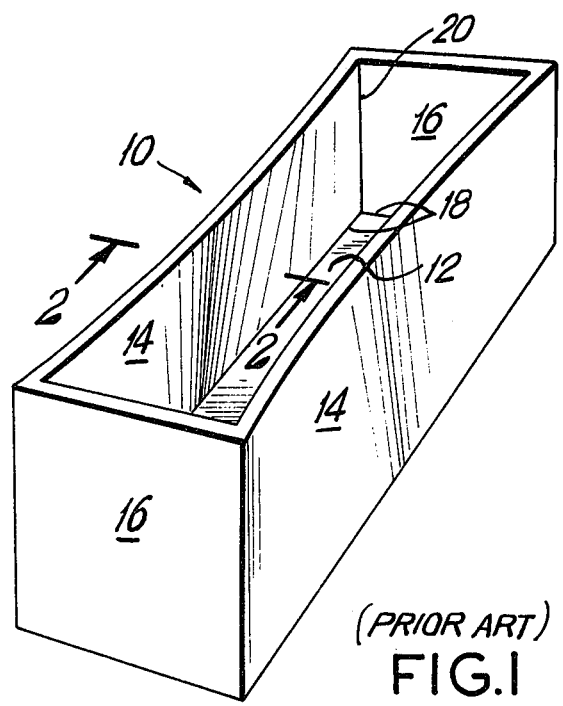
FIG. 1 is a perspective view of a thermoplastic part of the prior art illustrating the inward warping of the opposed side walls.
Figure 2:
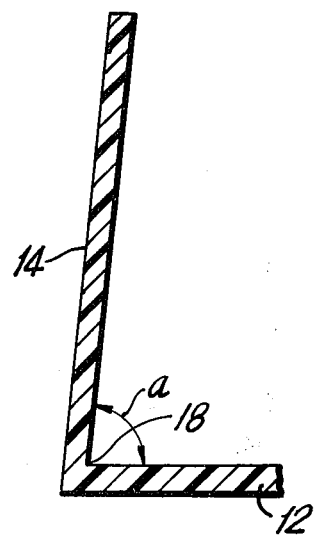
FIG. 2 is a partial cross-sectional view of the plastic part of the prior art, taken along the line 2—2 in FIG. 1, and illustrating the inward warping of a side wall relative to the bottom wall.

Referring to FIGS. 1 and 2 there is illustrated a typical thermoplastic part 10 manufactured in accordance with prior art injection molding techniques. More specifically, in the formation of the thermoplastic part 10, molten plastic is injected under pressure into a die (not shown) having a cavity or recess corresponding to the configuration of the part. After the plastic has been injected, the die is opened releasing the part such that the plastic can cool to room temperature.

The illustrated prior art part 10, which has been selected merely for illustrative purposes, has an open box configuration of unitary construction, including a bottom wall 12 and opposed pairs of upstanding side and end walls 14 and 16 respectively. As discussed above, the junctures between the structural elements of the part 10, define local areas of varying wall thickness. For example, the junctures 18, between the bottom wall 12 and side and end walls 14, 16 define local areas of increased plastic thickness. Similarly, the junctures 20 between the end and side walls also define local areas of non-uniform plastic thickness. Since the cooling rate of a particular plastic is dependent in part upon its local thickness, the junctures 18 and 20 will cool at a different rate than the various wall members of the part 10. The non-uniform cooling rates present throughout the part results in different local areas of the part shrinking at different rates. The differential shrinkage creates internal stresses such that the wall members tend to warp in order to relieve the stress.

As illustrated in FIG. 1, the opposed side wall members 14 are seen to be bowed arcuately inwardly, towards each other, as a result of the local internal stresses developed about junctures 20 between the side and end walls. Similarly, warpage frequently occurs due to local stresses developed along the junctures 18 between the bottom wall 12, and the side and end walls. As illustrated in FIG. 2, these stresses may, for example, result in an inward bending of side wall 14, relative to the bottom wall 12, such that an angle "a" is defined which is less than the desired 90°.

Figure 3:
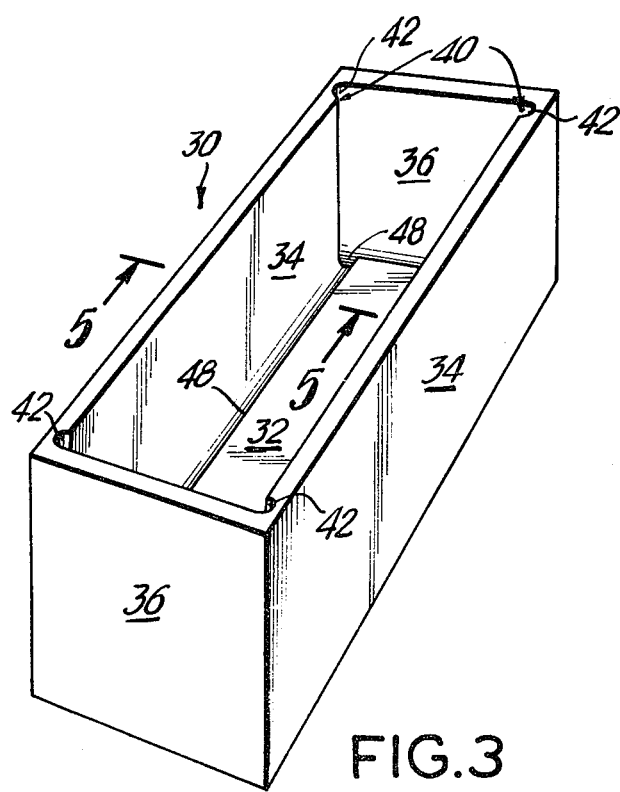
FIG. 3 is a perspective view of a new and improved thermoplastic molded part of the subject invention illustrating the location of the stress reducing junctures.
Figure 4:
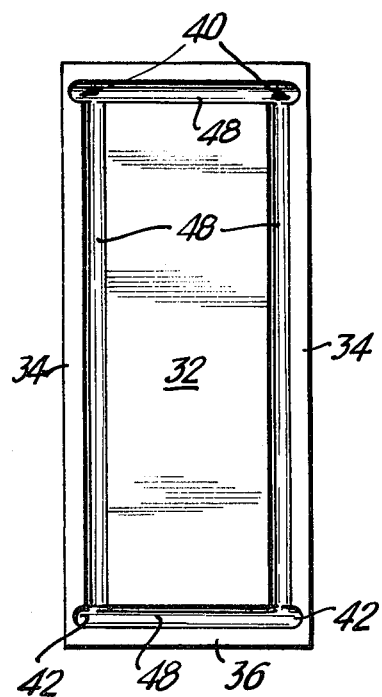
FIG. 4 is a top plan view of the new and improved thermoplastic part of the subject invention.
Figure 5:
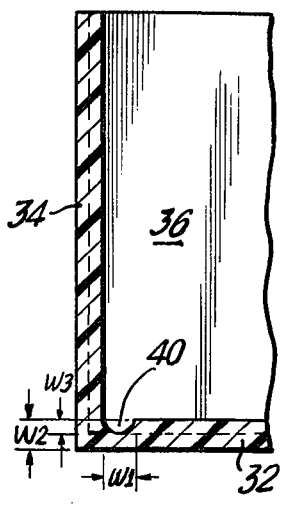
FIG. 5 is a partial cross-sectional view of the thermoplastic part of the subject invention taken along the line 5—5 in FIG. 3.

Referring now to FIGS. 3–5, there is illustrated an improved thermoplastic molded part, manufactured in accordance with the subject invention which includes stress reducing juctures or restrictions that function to inhibit the warping of the part. While the stress reducing junctures are shown illustrated in conjunction with an open box structure, the subject invention is not intended to be limited thereby, and is intended to be utilized with any thermoplastic part which includes intersections between structural elements such as walls, bosses or flanges.

Molded part 30 includes a bottom wall 32 formed unitary with opposed upstanding pairs of side and end walls 34, and 36 respectively. In accordance with the subject invention, the thermoplastic molded part 30 is further provided with a plurality of stress reducing junctures which function to inhibit the warping of the part 30. Each stress reducing juncture, indicated generally by the numeral 40, consists of an elongated trough-like recess, located in a wall member adjacent its intersection with another structural element. For example, two upstanding junctures 42 are provided in each side wall 34, adjacent their intersection with end walls 36. Each stress reducing juncture 42 extends from the top of the side wall 34 to the bottom wall 32, parallel to and contiguous with the associated intersection with the end walls. The junctures 42 are intended to inhibit the inward bowing of the side walls as illustrated in FIG. 1 of the prior art part 10. In order to prevent the inward bending of the side walls 34, seen in the prior art part 10 as illustrated in FIG. 2, part 30 may also be provided with additional stress reducing junctures 48 formed in the bottom wall 32 parallel to and contiguous with its intersection with the side and end walls 34 and 36.

Referring to FIG. 5, the preferred dimensions of the junctures 40 are more clearly illustrated. It is intended that the width and depth of all the recesses 40 be regulated in accordance with the width of the particular wall member in which the recess is located. More specifically, with width W1 of the recess 40 is preferably substantially similar to the width W2 of the wall 32. Further, the depth W3 of the recess is preferably equal to one-half the width W2 of the wall.

As illustrated in the FIGS. 3 through 5, the provision of the longitudinally extending recesses functions to substantially inhibit the warping of the part 30. More specifically, the recesses permit the plastic part to cool to room temperature at a more uniform rate thereby inhibiting the part from locally shrinking at different rates. By eliminating the differential shrinkage gradient, which would otherwise result in the development of localized internal stresses, the unwanted warping of the part is substantially reduced. Preferably, the location and arrangement of the stress reducing junctures are defined during the design of the part and are incorporated into the initial manufacture of the dies. By this arrangement subsequent machining and retooling of the dies can be avoided.

Figure 6:
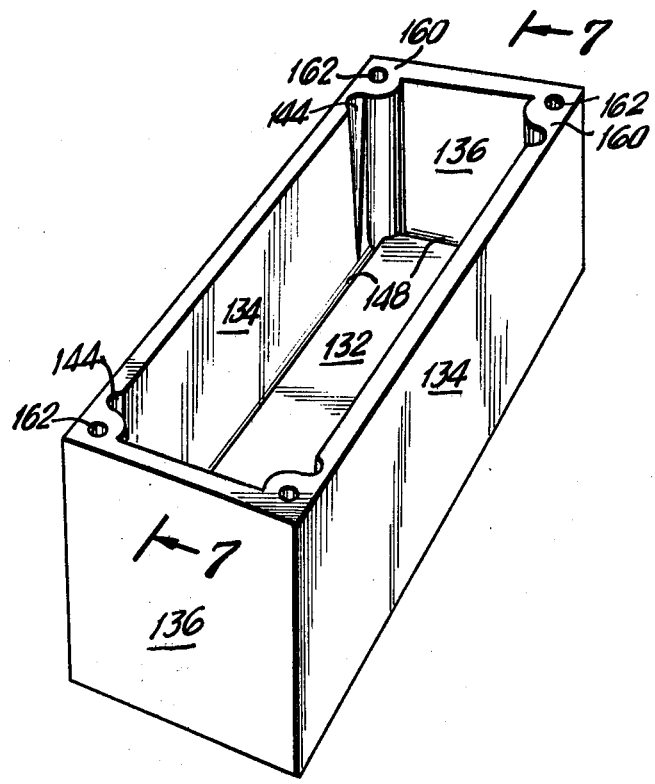
FIG. 6 is a perspective view of another thermoplastic part illustrating an alternate embodiment of the stress reducing juncture of the subject invention.
Figure 7:
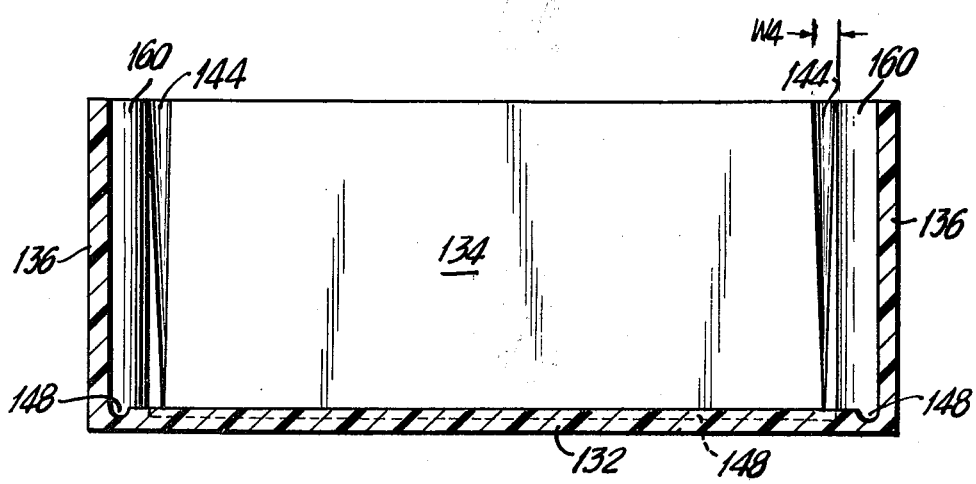
FIG. 7 is a cross-sectional view of the thermoplastic part, taken along the line 7—7 in FIG. 6, illustrating the alternate embodiment of the stress reducing juncture of the subject invention.

Referring now to FIGS. 6 and 7, there is illustrated a different type of injection molded part, 130 in which there is incorporated an alternate embodiment of the stress reducing juncture 140 of the subject invention. Similar to part 30, illustrated in FIGS. 3 through 5, part 130 includes a planar bottom wall 132 formed unitary with opposed upstanding side end walls 134 and 136 respectively. Part 130, further includes cylindrical protrusions or bosses 160, disposed at the four corners of the part. The bosses 160 may be provided to strengthen the corners of part 130 or to provide a means of attachment with another part. In the latter case, and as illustrated in FIG. 6, the bosses 160 may be provided with apertures 162 into which connecting pins, projecting from a cover member (not shown) may be received.

Similar to the first embodiment of the subject invention, stress reducing junctures 148 are located parallel to and contiguous with the intersections between the bottom wall 132 and the side and end walls 134, 136. The stress reducing junctures 148 are provided to prevent the side and end walls from warping inwardly, such that a perpendicular relationship is maintained with bottom wall 132.

In accordance with the subject invention, the arcuate bow-like warpage of the side walls 134 is minimized by providing a pair of stress reducing junctures 144 in each side wall, parallel to and contiguous with its intersection with the associated boss 160. As more clearly illustrated in FIG. 7, in the alternate embodiment of the subject invention, each stress reducing juncture 144 is tapered from the top edge of the side wall to the bottom edge thereof. More specifically, the width W4 of the top end of the juncture 144 is preferably equal to the width of the side wall 134. The width of the recess then gradually tapers down to zero, as it approaches and intersects with bottom wall 132. The depth of the recess, adjacent the top end of the side wall 134 is preferably equal to one-half the width of the wall. The tapered configuration of the stress reducing juncture 144 may be utilized to satisfy various structural requirements. It is to be understood however, that the tapered restriction, which is illustrated in conjunction with a wall and boss intersection, is not limited thereto and may be utilized at intersections of various other structural elements.

In summary, there is provided a new and improved thermoplastic molded part having a stress reducing juncture for inhibiting the warping of the part. More particularly, a thermoplastic part is disclosed having at least one wall member formed unitary with at least one other structural element such as another wall, flange or boss area. Warpage of the part is minimized by a new and improved stress reducing juncture, defined by an elongated trough-like recess, located in a wall member adjacent the other structural element. The stress reducing juncture is operative to reduce differential shrinkage of the molded plastic, which would otherwise develop due to the uneven cooling of the plastic to room temperature. By reducing the differential shrinkage gradient, internal stresses are decreased thereby inhibiting the warping of the part.

While the subject invention has been described with references to preferred embodiments, obviously other modifications and variations of the present invention are possible, in the light of the above teachings. It is therefore to be understood that changes may be made in the particular embodiments of the invention described which are within the full intended scope of the invention as defined by the appended claims.

What is claimed is:

1. An improved thermoplastic injection molded part, said part including at least one wall member formed unitary with at least one other structural element such as another wall, flange, or boss area, with the improvement comprising a stress reducing juncture, said stress reducing juncture being defined by an elongated trough-like recess located in said one wall adjacent said other structural element, said stress reducing juncture being operative to reduce the differential shrinkage of the molded plastic which would otherwise develop due to the uneven cooling of the plastic to room temperature, whereby internal stresses are decreased thereby inhibiting the warping of said part.

2. A thermoplastic molded part as recited in claim 1 wherein the width, W1, of said recess of said stress reducing juncture is equal to the width, W2, of said one wall.

3. A thermoplastic molded part as recited in claim 1 wherein the depth, W3, of said recess of said stress reducing juncture is equal to one-half the width, W2, of said one wall.

4. A thermoplastic molded part as recited in claim 1 wherein the width of said recess of said stress reducing juncture narrows towards one end thereof.

5. A thermoplastic molded part as recited in claim 1 wherein the width, W1, of said recess of said stress reducing juncture adjacent one end thereof is equal to the width, W2, of said one wall and wherein the width of said stress reducing juncture tapers towards the opposed end thereof.

6. A thermoplastic molded part as recited in claim 1 wherein said recess of said stress reducing juncture extends parallel to the intersection between said one wall and said other structural element.

7. A thermoplastic molded part as recited in claim 1 wherein said recess of said stress reducing juncture is contiguous with the intersection between said one wall and said other structural element.

8. A thermoplastic molded part as recited in claim 1 wherein the width, W1, of said recess of said stress reducing juncture is equal to the width, W2, of said one wall and the depth, W3, of said recess is equal to one-half the width, W2, of said one wall.

9. A thermoplastic molded part as recited in claim 8 wherein said recess of said stress reducing juncture extends parallel to and contiguous with the intersection between said one wall and said other structural element.

10. An improved thermoplastic molded part, said part including at least one wall member formed unitary with at least one other structural element such as another wall, flange, or boss area, with the improvement comprising a stress reducing juncture, said stress reducing juncture being defined by an elongated trough-like recess located in said one wall adjacent said other structural element, the width, W1, of said recess of said stress reducing juncture adjacent one end thereof being equal to the width, W2, of said one wall and the width of said stress reducing juncture being tapered towards the opposed end thereof, said stress reducing juncture being operative to reduce the differential shrinkage of the molded plastic which would otherwise develop due to the uneven cooling of the plastic to room temperature, whereby internal stresses are decreased thereby inhibiting the warping of said part.

* * * * *